(12) United States Patent
Maekawa

(10) Patent No.: US 11,665,431 B2
(45) Date of Patent: May 30, 2023

(54) PHOTOELECTRIC CONVERSION DEVICE AND METHOD OF DRIVING PHOTOELECTRIC CONVERSION DEVICE

(71) Applicant: CANON KABUSHIKI KAISHA, Tokyo (JP)

(72) Inventor: Shintaro Maekawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/551,496

(22) Filed: Dec. 15, 2021

(65) Prior Publication Data

US 2022/0201182 A1 Jun. 23, 2022

(30) Foreign Application Priority Data

Dec. 17, 2020 (JP) .............................. JP2020-209596

(51) Int. Cl.
*H04N 23/73* (2023.01)
*H04N 5/235* (2006.01)

(52) U.S. Cl.
CPC ................................ *H04N 5/2353* (2013.01)

(58) Field of Classification Search
None
See application file for complete search history.

(56) References Cited

U.S. PATENT DOCUMENTS

| 10,634,556 B2* | 4/2020 | Fukuchi ................ G01J 1/44 |
| 10,785,439 B2* | 9/2020 | Ikedo ................ H04N 5/37452 |
| 2020/0358972 A1 | 11/2020 | Suzuki et al. |

FOREIGN PATENT DOCUMENTS

| JP | 2003-243694 A | 8/2003 |
| JP | 2019-140537 A | 8/2019 |

* cited by examiner

*Primary Examiner* — Ahmed A Berhan
(74) *Attorney, Agent, or Firm* — Venable LLP

(57) ABSTRACT

The disclosed photoelectric conversion device includes a photoelectric conversion unit outputting a pulse signal in response to an incident of photon, a signal processing unit that is connected to the photoelectric conversion unit and counts the pulse signal, and a control unit that controls the signal processing unit. The signal processing unit includes a first count processing unit and a second count processing unit arranged in parallel. The control unit is configured to set an active period and an inactive period for each of the first count processing unit and the second count processing unit. A period during which the first count processing unit is active includes a first period during which the second count processing unit is active and a second period during which the second count processing unit is inactive.

21 Claims, 13 Drawing Sheets

PHOTOELECTRIC CONVERSION DEVICE AND METHOD OF DRIVING PHOTOELECTRIC CONVERSION DEVICE

BACKGROUND OF THE DISCLOSURE

Field of the Disclosure

The aspect of the embodiments relates to a photoelectric conversion device and a method of driving the photoelectric conversion device.

Description of the Related Art

A single photon avalanche diode (SPAD: Single Photon Avalanche Diode) is known as a detector capable of detecting weak light at a single photon level. SPAD amplifies signal charge excited by photon by several times to several million times by using an avalanche multiplication phenomenon generated by a strong electric field induced in a p-n junction of a semiconductor. The number of incident photons can be directly measured by converting the current generated by the avalanche multiplication phenomenon into a pulse signal and counting the number of pulse signals. Japanese Patent Application Laid-Open No. 2019-140537 discloses an example in which a method of counting the number of pulse signals output from a sensor unit is devised and an additional function is given to a sensing device.

However, in the conventional technique, the exposure control of the photoelectric conversion device is not sufficiently considered, and appropriate exposure control cannot be necessarily performed in accordance with the occurrence pattern of an event in which photons are incident.

SUMMARY OF THE DISCLOSURE

An object of the embodiments is to provide a technique for realizing high functionality of exposure control in a photoelectric conversion device having a function of counting incident photons.

According to an aspect of the embodiments, there is provided a photoelectric conversion device including a photoelectric conversion unit configured to output a pulse signal in response to an incident of photon, a signal processing unit connected to the photoelectric conversion unit and configured to count the pulse signal, and a control unit configured to control the signal processing unit, wherein the signal processing unit includes a first count processing unit and a second count processing unit arranged in parallel, wherein the control unit is configured to set an active period and an inactive period for each of the first count processing unit and the second count processing unit, and wherein a period during which the first count processing unit is active includes a first period during which the second count processing unit is active and a second period during which the second count processing unit is inactive.

According to another aspect of the embodiments, there is provided a photoelectric conversion device including a photoelectric conversion unit configured to output a pulse signal in response to an incident of photon, a signal processing unit connected to the photoelectric conversion unit and configured to count the pulse signal, and a control unit configured to control the signal processing unit, wherein the signal processing unit includes a plurality of count processing units arranged in parallel, wherein the control unit is configured to set an active period and an inactive period for each of the plurality of count processing units, wherein a period during which each of the plurality of count processing units is active is different from each other, and wherein at least a part of the active period is overlapped in at least a part of the plurality of count processing units.

According to still another aspect of the embodiments, there is provided a method of driving a photoelectric conversion device including a photoelectric conversion unit configured to output a pulse signal in response to an incident of photon, and a signal processing unit connected to the photoelectric conversion unit and configured to count the pulse signal, wherein the signal processing unit includes a plurality of count processing units arranged in parallel, the method including setting an active period and an inactive period in each of the plurality of count processing units such that the active periods of the plurality of count processing units are different from each other and at least a part of the active period is overlapped in at least a part of the plurality of count processing units.

Further features of the disclosure will become apparent from the following description of exemplary embodiments with reference to the attached drawings.

DESCRIPTION OF THE EMBODIMENTS

Preferred embodiments of the disclosure will now be described in detail in accordance with the accompanying drawings.

First Embodiment

Figure 1:
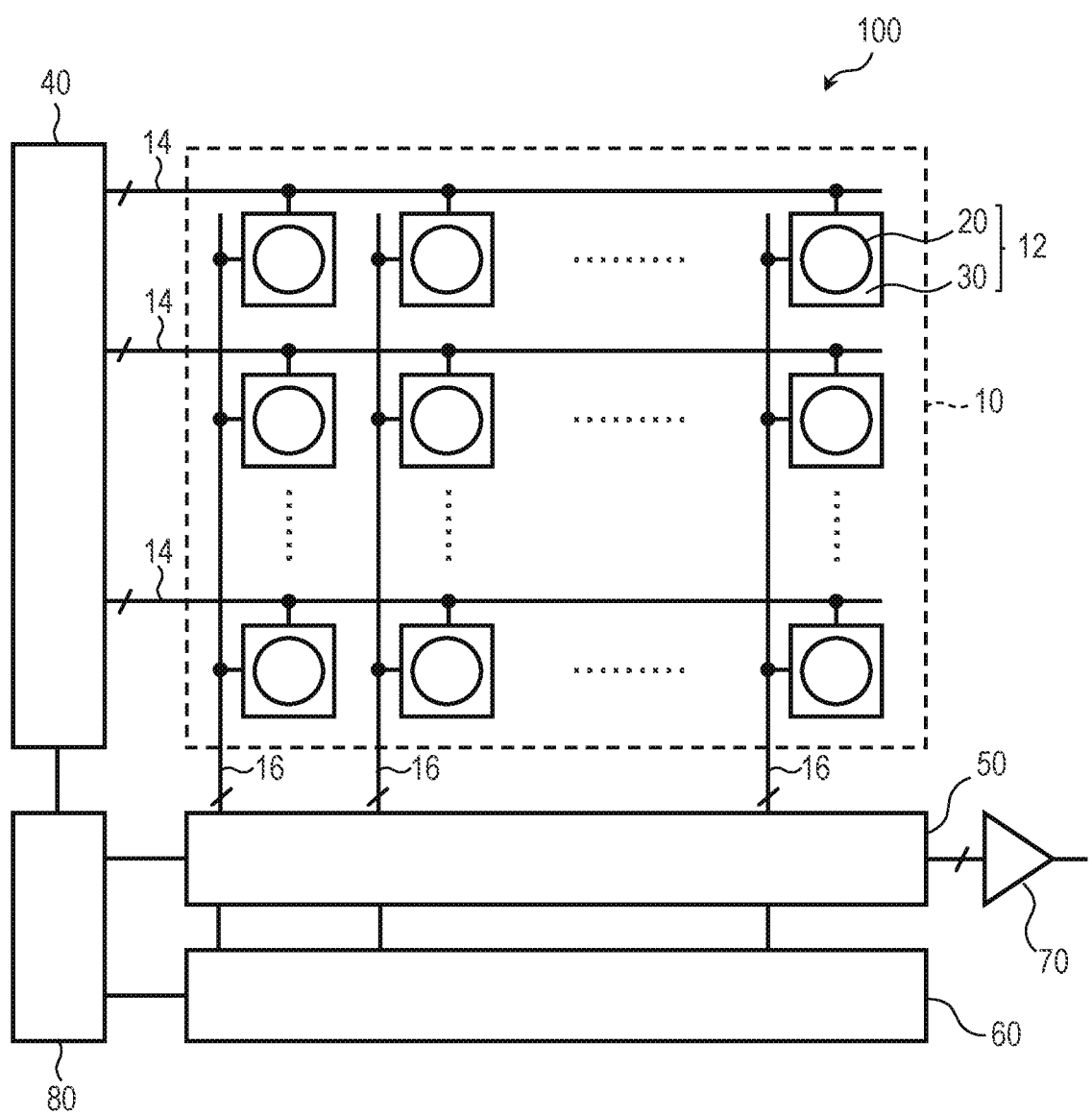
FIG. 1 is a block diagram illustrating a schematic configuration of a photoelectric conversion device according to a first embodiment.
Figure 2:
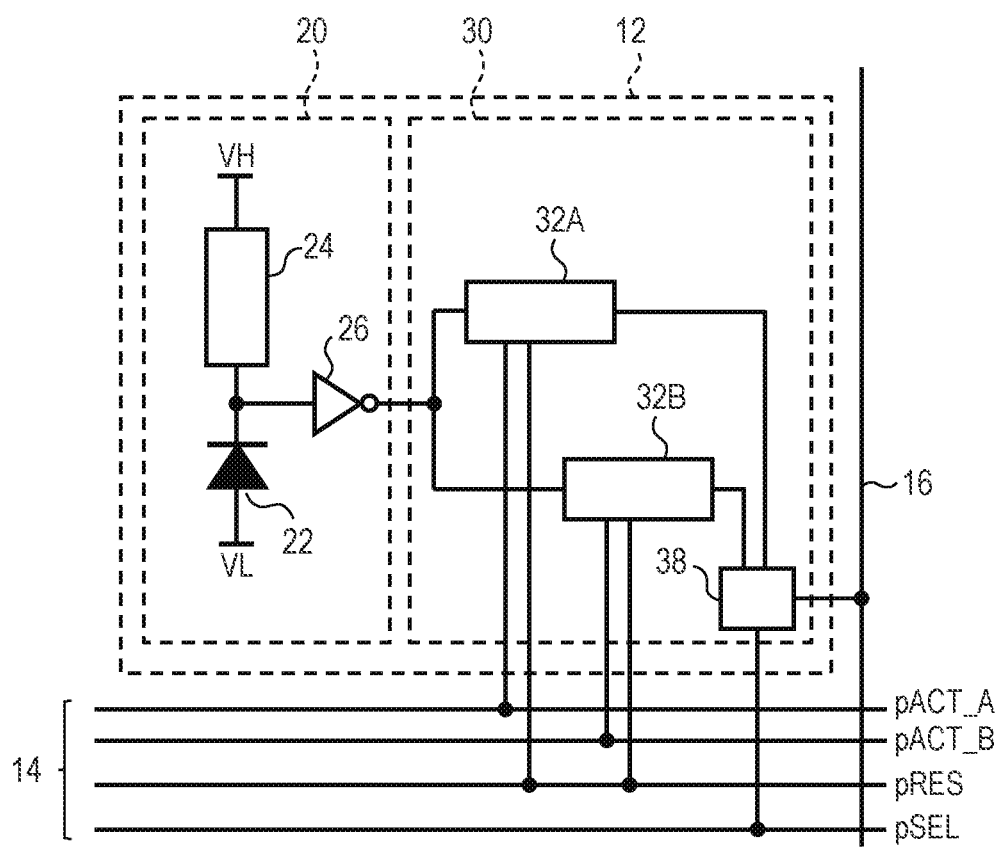
FIG. 2 is a block diagram illustrating a configuration example of a pixel of the photoelectric conversion device according to the first embodiment.
Figure 3A:
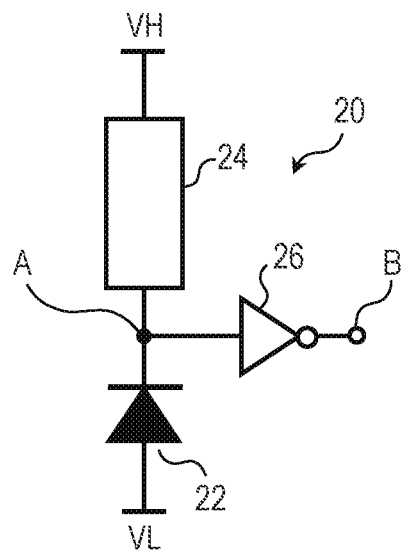
FIG. 3A, FIG. 3B, and FIG. 3C are diagrams illustrating the basic operation of a photoelectric conversion unit of the photoelectric conversion device according to the first embodiment.
Figure 3B:
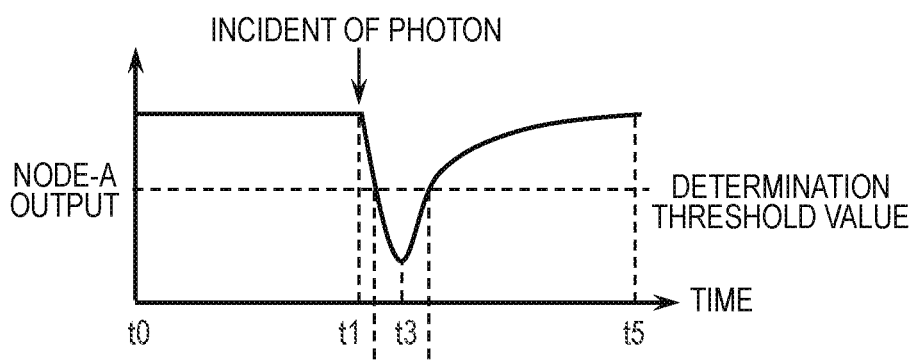
Figure 3C:
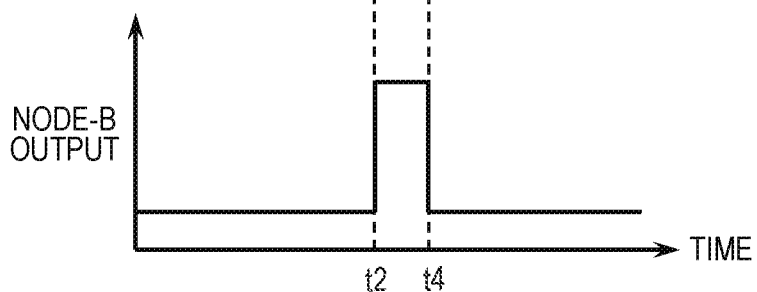
Figure 4:
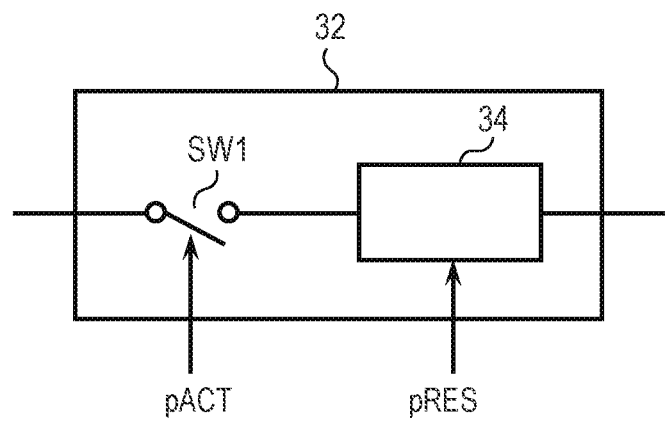
FIG. 4 is a diagram illustrating a configuration example of a count processing unit of the photoelectric conversion device according to the first embodiment.
Figure 5:
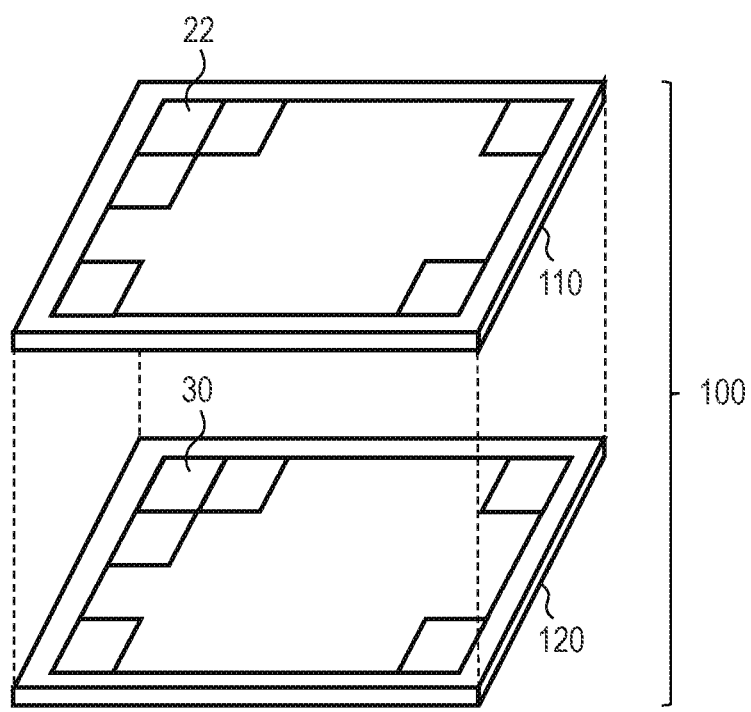
FIG. 5 is a perspective view illustrating a configuration example of the photoelectric conversion device according to the first embodiment.
Figure 6:
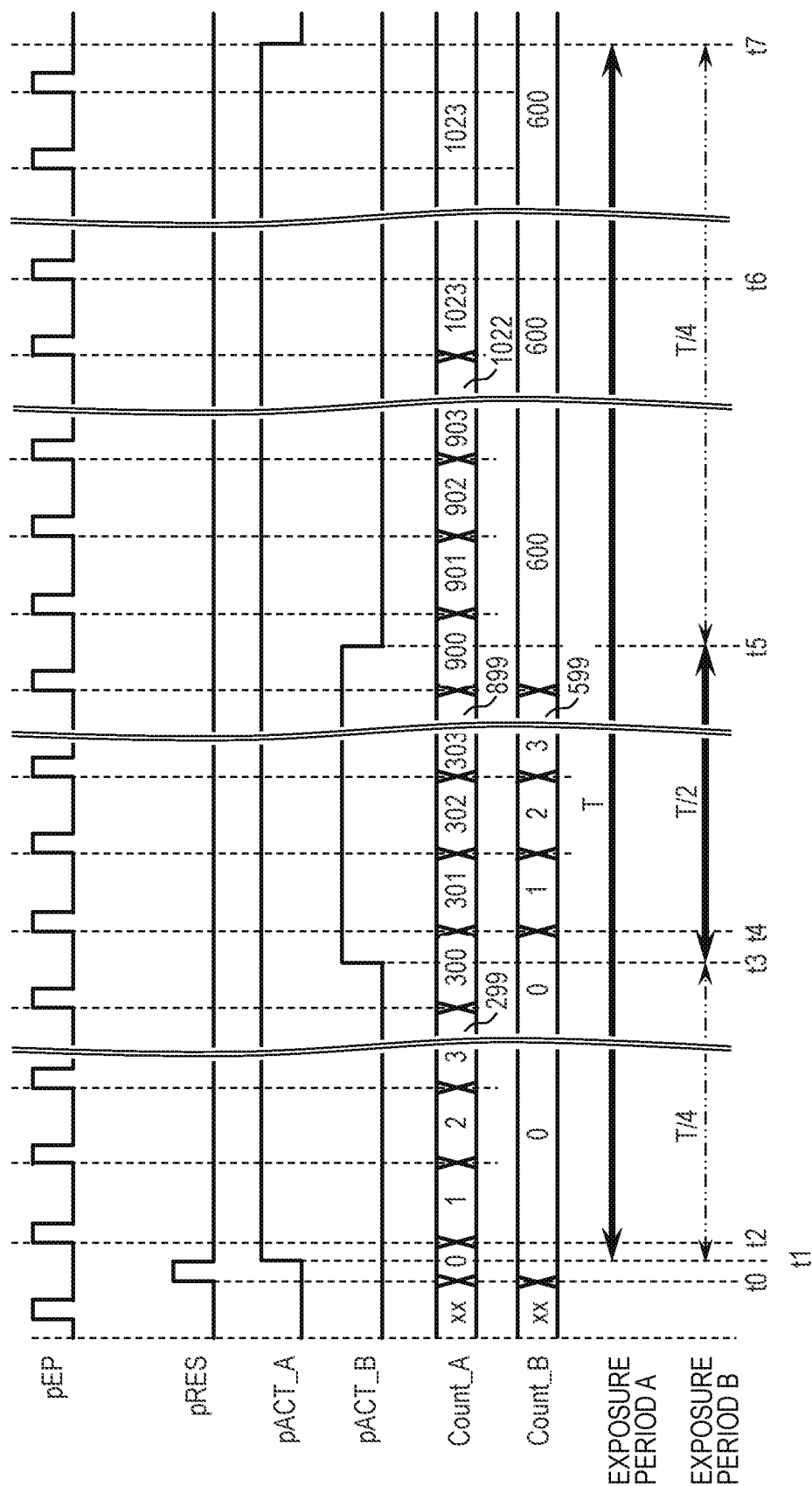
FIG. 6 is a timing chart illustrating an example of a method of driving the photoelectric conversion device according to the first embodiment.

A photoelectric conversion device and a method of driving the same according to a first embodiment of the disclosure will be described with reference to FIG. 1 to FIG. 6. FIG. 1 is a block diagram illustrating a schematic configuration of a photoelectric conversion device according to the present embodiment. FIG. 2 is a block diagram illustrating a configuration example of a pixel of the photoelectric conversion device according to the present embodiment. FIG. 3A to FIG. 3C are diagrams illustrating the basic operation of a photoelectric conversion unit of the photoelectric conversion device according to the present embodiment. FIG. 4 is a diagram illustrating a configuration example of a count processing unit of the photoelectric conversion device according to the present embodiment. FIG. 5 is a perspective view illustrating a configuration example of the photoelectric conversion device according to the present embodiment. FIG. 6 is a timing chart illustrating an example of a method of driving the photoelectric conversion device according to the present embodiment.

First, the structure of the photoelectric conversion device according to the present embodiment will be described with reference to FIG. 1 to FIG. 5.

As illustrated in FIG. 1, the photoelectric conversion device 100 according to the present embodiment includes a pixel unit 10, a vertical scanning circuit unit 40, a readout circuit unit 50, a horizontal scanning circuit unit 60, an output circuit unit 70, and a control pulse generation unit 80.

The pixel unit 10 is provided with a plurality of pixels 12 arranged in an array so as to form a plurality of rows and a plurality of columns. Each pixel 12 may include a photoelectric conversion unit 20 including a photon detection element and a pixel signal processing unit 30. The number of pixels 12 included in the pixel unit 10 is not particularly limited. For example, the pixel unit 10 may be constituted by a plurality of pixels 12 arranged in an array of several thousand rows× several thousand columns as in a general digital camera. Alternatively, the pixel unit 10 may be formed of a plurality of pixels 12 arranged in one row or one column. Alternatively, the pixel unit 10 may be formed of one pixel 12.

In each row of the pixel array of the pixel unit 10, a control line 14 is arranged so as to extend in a first direction (a lateral direction in FIG. 1). Each of the control lines 14 is connected to the pixels 12 aligned in the first direction, and forms a signal line common to these pixels 12. The first direction in which the control lines 14 extend may be referred to as a row direction or a horizontal direction. Each of the control lines 14 may include a plurality of signal lines for supplying a plurality of types of control signals to the pixels 12.

In each column of the pixel array of the pixel unit 10, a data line 16 is arranged so as to extend in a second direction (vertical direction in FIG. 1) intersecting the first direction. Each of the data lines 16 is connected to the pixels 12 aligned in the second direction, and forms a signal line common to these pixels 12. The second direction in which the data lines 16 extend may be referred to as a column direction or a vertical direction. Each of the data lines 16 may include a plurality of signal lines for transferring a digital signal of a plurality of bits output from the pixel 12 on a bit-by-bit basis.

The control line 14 in each row is connected to the vertical scanning circuit unit 40. The vertical scanning circuit unit 40 is a control unit that receives a control signal output from the control pulse generation unit 80, generates a control signal for driving the pixel 12, and supplies the control signal to the pixel 12 via the control line 14. A logic circuit such as a shift register or an address decoder may be used for the vertical scanning circuit unit 40. The vertical scanning circuit unit 40 sequentially scans the pixels 12 in the pixel unit 10 row by row, and outputs pixel signals of the pixels 12 to the readout circuit unit 50 via the data lines 16.

The data line 16 in each column is connected to the readout circuit unit 50. The readout circuit unit 50 includes a plurality of holding units (not illustrated) provided corresponding to respective columns of the pixel array of the pixel unit 10, and has a function of holding pixel signals of the pixels 12 of respective columns output from the pixel unit 10 via the data lines 16 row by row in the holding units of corresponding columns.

The horizontal scanning circuit unit 60 is a control unit that supplies a control signal for reading out the pixel signals from the holding unit of each column of the readout circuit unit 50 to the readout circuit unit 50. A logic circuit such as a shift register or an address decoder may be used for the horizontal scanning circuit unit 60. The horizontal scanning circuit unit 60 sequentially scans the holding units of the respective columns of the readout circuit unit 50, and sequentially outputs pixel signals held in the holding units to the output circuit unit 70.

The output circuit unit 70 has an external interface circuit and is a circuit unit that outputs the pixel signals output from the readout circuit unit 50 to the outside of the photoelectric conversion device 100. The external interface circuit included in the output circuit unit 70 is not particularly limited. As the external interface circuit, for example, SerDes (SERializer/DESerializer) transmission circuits such as LVDS (Low Voltage Differential Signaling) circuits and SLVS (Scalable Low Voltage Signaling) circuits may be applied.

The control pulse generation unit 80 is a control circuit for generating control signals for controlling the operation and timing of the vertical scanning circuit unit 40, the readout circuit unit 50, and the horizontal scanning circuit unit 60, and supplying the control signals to each functional block. At least a part of control signals for controlling the operation and timing of the vertical scanning circuit unit 40, the readout circuit unit 50, and the horizontal scanning circuit unit 60 may be supplied from the outside of the photoelectric conversion device 100.

As illustrated in FIG. 2, each pixel 12 includes a photoelectric conversion unit 20 and a pixel signal processing unit 30. The photoelectric conversion unit 20 includes a photon detection element 22, a quenching element 24, and a waveform shaper 26. The pixel signal processing unit 30 includes count processing units 32A and 32B and a selection circuit 38.

The photon detection element 22 may be an avalanche photodiode (hereinafter referred to as "APD"). The anode of the APD constituting the photon detection element 22 is connected to a node to which a voltage VL is supplied. The cathode of the APD constituting the photon detection element 22 is connected to one terminal of the quenching element 24. The other terminal of the quenching element 24 is connected to a node to which a voltage VH higher than the voltage VL is supplied. The voltage VL and the voltage VH are set such that a reverse bias voltage sufficient for the APD to perform an avalanche multiplication operation is applied. In one example, a negative high voltage is applied as the voltage VL, and a positive voltage approximately equal to the power supply voltage is applied as the voltage VH. For example, the voltage VL is −30 V and the voltage VH is 1 V.

The input node of the waveform shaper 26 is connected to a connection node between the photon detection element 22 and the quenching element 24. The output node of the waveform shaper 26 is connected to the input node of the count processing unit 32A and the input node of the count processing unit 32B. The output node of the count processing unit 32A and the output node of the count processing unit 32B are connected to the input node of the selection circuit 38. An output node of the selection circuit 38 is connected to the data line 16. The data line 16 may include a signal line for outputting a signal from the count processing unit 32A and a signal line for outputting a signal from the count processing unit 32B.

The control line 14 includes a signal line to which the control signal pACT_A is supplied, a signal line to which the control signal pACT_B is supplied, a signal line to which the control signal pRES is supplied, and a signal line to which the control signal pSEL is supplied. The two control nodes of the count processing unit 32A are connected to a signal line to which the control signal pACT_A is supplied and a signal line to which the control signal pRES is supplied, respectively. The two control nodes of the count processing unit 32B are connected to a signal line to which the control signal pACT_B is supplied and a signal line to which the control signal pRES is supplied, respectively. The control node of the selection circuit 38 is connected to a signal line to which the control signal pSEL is supplied.

The photon detection element 22 may be comprised of an APD as described above. When a reverse bias voltage sufficient to perform the avalanche multiplication operation is supplied to the APD, charges generated by light incidence on the APD cause avalanche multiplication, and an avalanche current is generated. Operation modes in a state where a reverse bias voltage is supplied to the APD include a Geiger mode and a linear mode. The Geiger mode is an operation mode in which a voltage applied between the anode and the cathode is set to a reverse bias voltage higher than the breakdown voltage of the APD. The linear mode is an operation mode in which a voltage applied between the anode and the cathode is set to a reverse bias voltage close to or lower than the breakdown voltage of the APD. The APD operating in the Geiger mode is called SPAD (Single Photon Avalanche Diode).

The quenching element 24 has a function of converting a change in the avalanche current generated in the photon detection element 22 into a voltage signal. The quenching element 24 functions as a load circuit (quenching circuit) at the time of signal multiplication by avalanche multiplication, and has a function of reducing the voltage applied to the photon detection element 22 to suppress avalanche multiplication. The operation in which the quenching element 24 suppresses the avalanche multiplication is called a quenching operation. The quenching element 24 may be formed of a resistor, a MOS transistor, or the like.

The waveform shaper 26 is a pulse generation unit that converts an analog signal (a change in the potential of the cathode of the photon detection element 22) output from the photon detection element 22 into a photon detection pulse signal at the time of photon detection, and may be configured by, for example, an inverter circuit. Note that FIG. 2 illustrates an example in which one inverter circuit is used as the waveform shaper 26, but the waveform shaper 26 is not limited to this, and for example, the waveform shaper 26 may be configured by a circuit in which a plurality of inverter circuits are connected in series, or may be configured by another circuit having a waveform shaping effect.

Each of the count processing units 32A and 32B has a function of counting pulses output from the waveform shaper 26 and holding a count value as a counting result. The count processing unit 32A counts pulses output from the waveform shaper 26 during a period in which the control signal pACT_A supplied from the vertical scanning circuit unit 40 via the control line 14 is active. Similarly, the count processing unit 32B counts the pulses output from the waveform shaper 26 during a period in which the control signal pACT_B supplied from the vertical scanning circuit unit 40 via the control line 14 is active. The control signals pACT_A and pACT_B are control signals for setting an exposure period. When the control signal pRES supplied from the vertical scanning circuit unit 40 via the control line 14 becomes active, the count processing units 32A and 32B reset the count values held therein. Although FIG. 2 illustrates an example in which the count processing units 32A and 32B are reset by the common control signal pRES, the control signal for resetting the count processing unit 32A and the control signal for resetting the count processing unit 32B may be different from each other.

The selection circuit 38 has a function of switching an electrical connection state (connection or disconnection) between the count processing units 32A and 32B and the data line 16. The selection circuit 38 switches the connection state between the count processing units 32A and 32B and the data line 16 in response to the control signal pSEL supplied from the vertical scanning circuit unit 40 via the control line 14. The selection circuit 38 may include a buffer circuit for outputting a signal.

FIG. 3A to FIG. 3C illustrate the operation of the photoelectric conversion unit 20. FIG. 3A is a circuit diagram of the photoelectric conversion unit 20, FIG. 3B illustrates a waveform of a signal at an input node (node-A) of the waveform shaper 26, and FIG. 3C illustrates a waveform of a signal at an output node (node-B) of the waveform shaper 26.

At time t0, a reverse bias voltage having a potential difference corresponding to (VH-VL) is applied to the photon detection element 22. Although a reverse bias voltage sufficient to cause avalanche multiplication is applied between the anode and the cathode of the APD constituting the photon detection element 22, no carrier is present as a species of avalanche multiplication in a state where photons are not incident on the photon detection element 22. Therefore, avalanche multiplication does not occur in the photon detection element 22, and no current flows in the photon detection element 22.

At subsequent time t1, it is assumed that photon is incident on the photon detection element 22 ("INCIDENT OF PHOTON" in FIG. 3B). When a photon enters the photon detection element 22, an electron-hole pair is generated by photoelectric conversion, and avalanche multiplication is generated using these carriers as seeds, and an avalanche multiplication current flows through the photon detection element 22. When the avalanche multiplication current flows through the quenching element 24, a voltage drop is caused by the quenching element 24, and the voltage of the node-A begins to drop. When the voltage drop amount of the node-A increases and the avalanche multiplication is stopped at time t3, the voltage level of the node-A does not drop further.

When the avalanche multiplication in the photon detection element 22 is stopped, a current that compensates for the voltage drop flows from the node to which the voltage VL is supplied to the node-A via the photon detection element 22, and the voltage of the node-A gradually increases. Thereafter, at time t5, the node-A is settled to the original voltage level.

The waveform shaper 26 binarizes the signal input from the node-A in accordance with a predetermined determination threshold value, and outputs the signal from the node-B. More specifically, the waveform shaper 26 outputs a Low level signal from the node-B when the voltage level of the node-A exceeds the determination threshold value, and outputs a High level signal from the node-B when the voltage level of the node-A is equal to or lower than the determination threshold value. For example, as illustrated in FIG. 3B, it is assumed that the voltage of the node-A is equal to or lower than the determination threshold value during a period from time t2 to time t4. In this case, as illustrated in FIG. 3C, the signal level at the node-B becomes Low level during the period from time t0 to time t2 and the period from time t4 to time t5, and becomes High level during the period from time t2 to time t4.

Thus, the analog signal input from the node-A is shaped into a digital signal by the waveform shaper 26. A pulse signal output from the waveform shaper 26 in response to incident of photon on the photon detection element 22 is a photon detection pulse signal.

FIG. 4 is a schematic diagram illustrating a configuration example of the count processing unit 32. Since the count processing unit 32A and the count processing unit 32B have the same structure, only one count processing unit 32 is illustrated in FIG. 4, and reference numerals A and B for distinguishing the count processing unit 32A and the count processing unit 32B are omitted.

As illustrated in FIG. 4, the count processing unit 32 includes a switch SW1 and a counter 34. One node of the switch SW1 is also an input node of the count processing unit 32 and is connected to the output node of the waveform shaper 26 (refer to FIG. 2). The other node of the switch SW1 is connected to the input node of the counter 34. The output node of the counter 34 is also the output node of the count processing unit 32, and is connected to the input node of the selection circuit 38. The control node of the switch SW1 is supplied with the control signal pACT from the vertical scanning circuit unit 40 via the control line 14. The control node of the counter 34 is supplied with the control signal pRES from the vertical scanning circuit unit 40 via the control line 14.

The counter 34 has a function of counting the pulse signal output from the waveform shaper 26 and holding the count value as a result of counting. For example, if the counter 34 is a 10-bit binary counter, a maximum of 1023 pulses may be counted and held between the time when the control signal pRES supplied from the vertical scanning circuit unit 40 becomes inactive and the time when the control signal pRES becomes active next. The counter 34 may be a counting means other than the binary counter, and the number of bits is not limited to 10 bits.

The switch SW1 has a function of switching whether the pulse signal output from the waveform shaper 26 is input to the counter 34 or is cut off in accordance with the control signal pACT supplied from the vertical scanning circuit unit 40. The switch SW1 may be realized by, for example, a CMOS switch circuit, but may be constituted by a logic circuit such as a decoder or other selection means.

By providing the switch SW1 in the preceding stage of the counter 34, the pulse signal output from the waveform shaper 26 may be input to the counter 34 and the number of pulse signals may be counted only during the period in which the control signal pACT is active. That is, by setting the period during which the control signal pACT becomes active, the period during which the pulse signal output from the waveform shaper 26 is counted by the counter 34 may be set.

By arranging a plurality of count processing units 32 having such functions in parallel, the photon detection pulse signal output from one photoelectric conversion unit 20 may be counted in parallel by the plurality of count processing units 32. The counting period in each of the plurality of count processing units 32 may be controlled by a control signal pACT.

In the present embodiment, the switch SW1 switches whether the pulse signal output from the waveform shaper 26 is input to the counter 34 or is cut off, but the counter 34 may have a function of selecting whether the count operation is enabled or disabled.

The photoelectric conversion device 100 according to the present embodiment may be formed on one substrate, or may be formed as a stacked photoelectric conversion device in which a plurality of substrates is stacked. In the latter case, for example, as illustrated in FIG. 5, the photoelectric conversion device may be configured as a stacked type photoelectric conversion device in which the sensor substrate 110 and the circuit substrate 120 are stacked and electrically connected. In the sensor substrate 110, at least the photon detection element 22 among the components of the pixel 12 may be disposed. Further, the pixel signal processing unit 30 among the constituent elements of the pixel 12 may be arranged on the circuit substrate 120. The circuit substrate 120 may further include a vertical scanning circuit unit 40, a readout circuit unit 50, a horizontal scanning circuit unit 60, an output circuit unit 70, a control pulse generation unit 80, and the like. When the stacked type photoelectric conversion device is formed, integration of elements may be increased and high functionality may be achieved. The photoelectric conversion device 100 may be formed by stacking three or more substrates.

Next, a method of driving the photoelectric conversion device according to the present embodiment will be described with reference to FIG. 6. The timing chart of FIG. 6 illustrates a pulse signal pEP, control signals pRES, pACT_A, and pACT_B, count values Count_A and Count_B, and exposure periods A and B. The pulse signal pEP is a photon detection pulse signal output from the node-B of the waveform shaper 26 in response to incident of photons. The count value Count_A is the count value of the counter 34 of the count processing unit 32A. The count value Count_B is the count value of the counter 34 of the count processing unit 32B. The exposure period A is a period during which a counting operation is performed in the count processing unit 32A in response to a period during which the control signal pACT_A is active. The exposure period B is a period during which a counting operation is performed in the count processing unit 32B in response to a period during which the control signal pACT_B is active.

In FIG. 6, as an example, it is assumed that 1200 photons are incident on a pixel 12 during a predetermined exposure period T at equal intervals without overlapping. The counter 34 counts up to 1023 pulses and can hold the count value.

First, the operation of the count processing unit 32A will be described.

At time t0, the control signal pRES becomes active (High level), and the count value Count_A of the counter 34 of the count processing unit 32A is reset to 0.

At subsequent time t1, the control signal pACT_A becomes active (High level), and the counter 34 of the count processing unit 32A starts counting the pulse signal pEP. Time t1 at which the control signal pACT_A becomes active is the start timing of the exposure period A.

At subsequent time t2, the pulse signal pEP becomes active (High level) in response to an incident of photon. When the counter 34 of the count processing unit 32A counts the pulse signal pEP, the count value Count_A of the counter 34 shifts from 0 to 1.

Thereafter, every time the pulse signal pEP becomes active, the count value Count_A is incremented. However, since the count value Count_A reaches 1023 which is the upper limit of the count value that can be held by the counter 34 at time t6, the count value Count_A is not incremented even if the pulse signal pEP rises at time t6.

At subsequent time t7, the control signal pACT_A becomes inactive (Low level), and the count processing unit 32A ends counting the pulse signal pEP. Time t7 at which the control signal pACT_A becomes inactive is the end timing of the exposure period A.

The count value Count_A held by the counter 34 of the count processing unit 32A at time t7 is expected to be equal to the number of photons incident during the exposure period A (time T). However, when the count value Count_A reaches 1023 of the maximum value that can be held by the counter 34 during the exposure period A, only information indicating that 1023 or more photons are incident may be obtained.

Next, the operation of the count processing unit 32B will be described.

At time t0, the control signal pRES becomes active, and the count value Count_B of the counter 34 of the count processing unit 32B is reset to 0.

At subsequent time t1, the control signal pACT_A becomes active and the exposure period A starts, but the control signal pACT_B is inactive (Low level). Although the pulse signal pEP becomes active at the subsequent time t2, the pulse signal pEP is not counted by the counter 34 of the count processing unit 32B, and the count value Count_B of the counter 34 of the count processing unit 32B remains 0.

At a subsequent time t3, the control signal pACT_B becomes active (High level), and the counter 34 of the count processing unit 32B starts counting the pulse signal pEP. Time t3 at which the control signal pACT_B becomes active is the start timing of the exposure period B.

At a subsequent time t4, the pulse signal pEP becomes active in response to an incident of photon. When the counter 34 of the count processing unit 32B counts the pulse signal pEP, the count value Count_B of the counter 34 shifts from 0 to 1.

Thereafter, every time the pulse signal pEP becomes active, the count value Count_B is incremented.

At time t5 when time T/2 has elapsed from time t3, control signal pACT_B becomes inactive (Low level), and count processing unit 32B ends counting pulse signal pEP. Time t5 at which the control signal pACT_B becomes inactive is the end timing of the exposure period B. It is assumed that the count value Count_B held by the counter 34 of the count processing unit 32B at time t5 is equal to or less than the maximum value (1023) of the count value that can be held by the counter 34, and here 600. Thereafter, the count value Count_B of the counter 34 of the count processing unit 32B is not incremented.

In the present embodiment, the length of the period during which the count processing unit 32B is continuously active is the same as the length of the period during which both of the count processing units 32A and 32B are active.

The count value Count_B held by the counter 34 of the count processing unit 32B at time t7 is equal to the number of photons incident during the exposure period B (time T/2).

Here, if the frequency of photons incident on the pixel 12 does not change greatly during the exposure period A, it may be estimated that photons of approximately twice of 600 are incident on the pixel 12 during the exposure period A (time T), which is twice the length of the exposure period B (time T/2). That is, by providing a plurality of count processing units 32 having different exposure periods, even if the count value exceeds the upper limit in some count processing units 32, information on the number of incident photons may be obtained from the count values of other count processing units 32.

By using the configuration and driving method of the present embodiment, it is possible to acquire an image having a wide dynamic range in the photoelectric conversion device 100 having the plurality of pixels 12. That is, by driving each pixel 12 of the pixel unit 10 as described above, it is possible to acquire an image at an appropriate exposure time while maintaining time synchronization for both a low-brightness region in which the time T is an appropriate exposure time and a high-brightness region in which the time T/2 is an appropriate exposure time in the image.

In the driving method of the present embodiment, the period during which the count processing unit 32A is active includes a period during which the count processing unit 32B is active and a period during which the count processing unit 32B is inactive. Providing both the count processing unit 32A and the count processing unit 32B with an active period has advantages such as enabling acquisition of information such as an optical flow of an object.

In the description of the present embodiment, although the length of the period from time t1 to time t3 is T/4, the length of the period from time t3 to time t5 is T/2, and the length of the period from time t5 to time t7 is T/4, the length of each period may be greater than 0 and the sum of the three periods may be T. By setting each period in this manner, information on the number of photons incident during each of the plurality of exposure periods may be acquired while maintaining time synchronization.

The count processing unit 32A and the count processing unit 32B do not necessarily have to have the same configuration. For example, since the counter 34 of the count processing unit 32B has a smaller count value than the counter 34 of the count processing unit 32A, the maximum value of the count value may be reduced. Thus, the circuit scale of the pixel signal processing unit 30 may be reduced.

As described above, according to the present embodiment, in the photoelectric conversion device having the function of counting incident photons, high functionality of exposure control may be realized.

Second Embodiment

A method of driving a photoelectric conversion device according to a second embodiment of the disclosure will be described with reference to FIG. 7. The same components as those of the photoelectric conversion device according to the first embodiment are denoted by the same reference numerals, and the description thereof will be omitted or simplified. In the present embodiment, another driving method of the photoelectric conversion device according to the first embodiment will be described.

Figure 7:
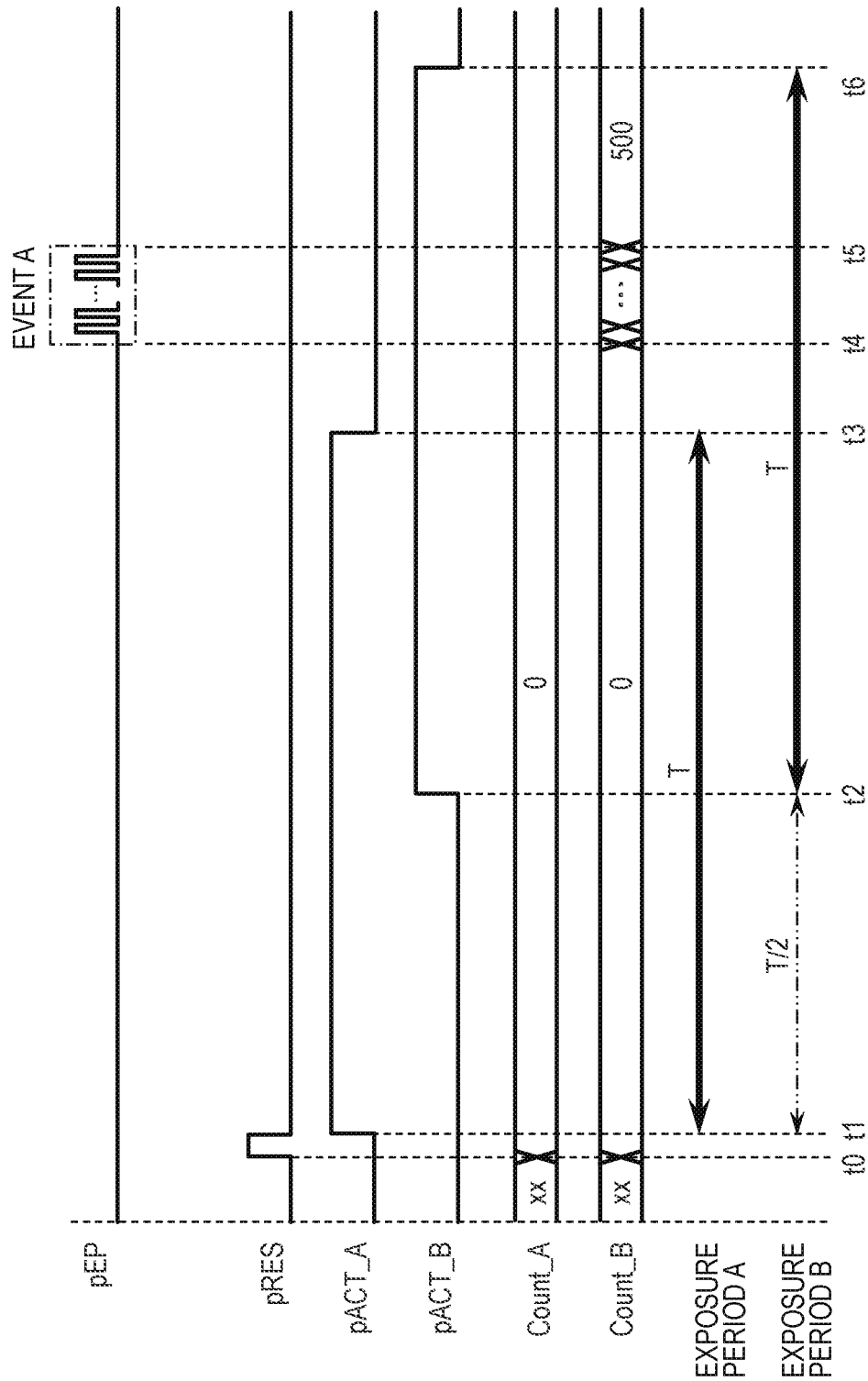
FIG. 7 is a timing chart illustrating an example of a method of driving the photoelectric conversion device according to a second embodiment.

FIG. 7 is a timing chart illustrating an example of a method of driving the photoelectric conversion device according to the present embodiment. Similarly to FIG. 6, the timing chart of FIG. 7 illustrates a pulse signal pEP, control signals pRES, pACT_A, and pACT_B, count values Count_A and Count_B, and exposure periods A and B.

In the driving method of the present embodiment, the length of the period during which the count processing unit 32A is continuously active and the length of the period during which the count processing unit 32B is continuously active are the same.

First, at time t0, the control signal pRES becomes active, and the count value Count_A of the counter 34 of the count processing unit 32A and the count value Count_B of the counter 34 of the count processing unit 32B are reset to 0.

At subsequent time t1, the control signal pACT_A becomes active, and the counter 34 of the count processing unit 32A starts counting the pulse signal pEP. Time t1 at which the control signal pACT_A becomes active is the start timing of the exposure period A.

Thereafter, at time t2 at which time T/2 has elapsed from time t1, the control signal pACT_B becomes active, and the counter 34 of the count processing unit 32B starts counting the pulse signal pEP. Time t2 at which the control signal pACT_B becomes active is the start timing of the exposure period B.

Thereafter, at time t3 when time T has elapsed from time t0, the control signal pACT_A becomes inactive, and the count processing unit 32A ends counting of the pulse signal pEP. Time t3 at which the control signal pACT_A becomes inactive is the end timing of the exposure period A. Thereafter, the count value Count_A of the counter 34 of the count processing unit 32A is not incremented.

It is assumed that an event (event A) in which 500 photons are incident on the pixel 12 occurs during a period from the subsequent time t4 to time t5. Then, 500 pulses are superimposed on the pulse signal pEP during the period from time t4 to time t5, and the count value Count_B of the counter 34 of the count processing unit 32B is incremented to 500.

Thereafter, at time t6 at which time T has elapsed from time t2, the control signal pACT_B becomes inactive, and the count processing unit 32B ends counting of the pulse signal pEP. A time t6 at which the control signal pACT_B becomes inactive is the end timing of the exposure period B. Thereafter, the count value Count_B of the counter 34 of the count processing unit 32B is not incremented.

As a result, at time t6, the count value Count_A held by the counter 34 of the count processing unit 32A becomes 0, and the count value Count_B held by the counter 34 of the count processing unit 32B becomes 500.

Here, as an example, it is assumed that the event A occurs at a cycle of 3T/2, but is not synchronized with the exposure periods A and B, and the occurrence time is shorter than T/2. When the length of the exposure period is desired to be T, the count processing unit 32A alone may not count the number of photons generated in the event A. For example, as illustrated in FIG. 7, if event A occurs between time t3 and time t6, the count processing unit 32A alone cannot count the number of photons generated in event A.

In this regard, in the driving method of the present embodiment, the exposure period B of the count processing unit 32B is set by shifting the phase of the exposure period A of the count processing unit 32A by T/2. Therefore, regardless of the phase relationship between event A and the exposure period, the number of photons incident in event A may be acquired. By using this method, in the photoelectric conversion device 100 having the plurality of pixels 12, it is possible to stably image the lighting of the light source which is turned on in a shorter time than the length of the exposure period and then turned off without synchronizing with the exposure period.

Further, according to the driving method of the present embodiment, continuous imaging with high temporal resolution may be performed. For example, both the event occurring between time t1 and time t3 and the event occurring between time t2 and time t6 overlapping the event occurring between time t1 and time t3 may be detected without resetting the count values of the count processing units 32A and 32B halfway or outputting them to the outside of the pixel 12. In this case, the length of the period from time t1 to time t2 is not necessarily required to be T/2, and may be a value larger than 0 and smaller than T. The period from time t1 to time t3 (exposure period A) and the period from time t2 to time t6 (exposure period B) do not necessarily need to have the same length, and may have different lengths.

As described above, according to the present embodiment, in the photoelectric conversion device having the function of counting incident photons, high functionality of exposure control may be realized.

Third Embodiment

A method of driving a photoelectric conversion device according to a third embodiment of the disclosure will be described with reference to FIG. 8. The same components as those of the photoelectric conversion device according to the first and second embodiments are denoted by the same reference numerals, and the description thereof will be omitted or simplified. In the present embodiment, another driving method of the photoelectric conversion device according to the first embodiment will be described.

Figure 8:
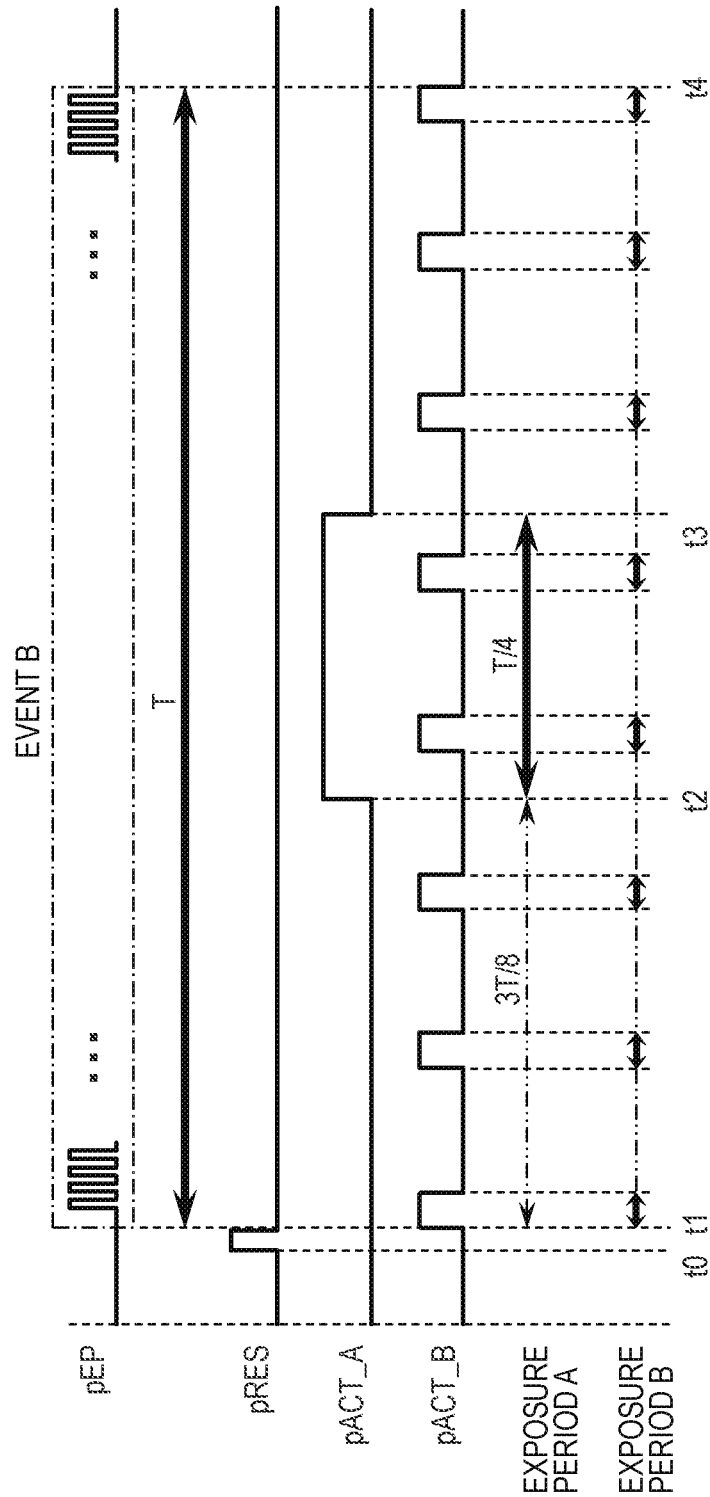
FIG. 8 is a timing chart illustrating an example of a method of driving the photoelectric conversion device according to a third embodiment.

FIG. 8 is a timing chart illustrating an example of a method of driving the photoelectric conversion device according to the present embodiment. The timing chart of FIG. 8 illustrates a pulse signal pEP, control signals pRES, pACT_A, and pACT_B, and exposure periods A and B.

In the present embodiment, the number of times the count processing unit 32A is active during a predetermined period (e.g., a frame period) is a first number of times (one time), and the number of times the count processing unit 32B is active during the predetermined period is a second number of times (eight times) larger than the first number of times. The period during which the count processing unit 32B is active and the period during which the count processing unit 32B is inactive are periodically repeated. Further, the total length of the periods during which the count processing unit 32A becomes active during a predetermined period (e.g., a frame period) is equal to the total length of the periods during which the count processing unit 32B becomes active during the predetermined period.

In the present embodiment, it is assumed that an event (event B) in which photons enter the pixel 12 occurs between time t1 and time t4. In this case, if one of the count processing unit 32A and the count processing unit 32B is always active while the event B is occurring, the total number of incident photons can be recorded. However, in the case where the scale of the count processing units 32A and 32B is limited or the band of the data line 16 is limited due to the restriction on the area of the pixel 12, it is necessary to reduce the amount of data held in the count processing units 32A and 32B. In such a case, it is effective to shorten the length of the period in which the count processing units 32A and 32B count photons with respect to the length T of the period in which the event B occurs, thereby reducing the amount of data held by the count processing units 32A and 32B.

The control signal pACT_A becomes active at time t2 after a time of 3T/8 has elapsed from time t1 at which event B starts, and becomes inactive at time t3 after a time of T/4 has elapsed from time t2. That is, the period from time t2 to time t3 is the exposure period A.

On the other hand, the control signal pACT_B periodically repeats active and inactive so that the total active time is T/4 in the period from time t1 to time t4. Of the period from time t1 to time t4, the period during which the control signal pACT_B is active is the exposure period B.

That is, the control signal pACT_A and the control signal pACT_B are different in the timing at which the control signal pACT_A and the control signal pACT_B become active, although the total length of the active period out of the period (length T) from time t1 to time t4 is T/4.

By thus setting the exposure periods A and B, the count processing unit 32A can densely detect the incident of photons during a period near the center of the period during which the event B occurs. In the count processing unit 32B, the incident of photons cannot be densely detected, but there is a timing at which the incident of photons can be detected over the entire period of the event B. Therefore, it is possible to acquire different information according to the difference in timing at which photons are detected by the count processing unit 32A and the count processing unit 32B.

Therefore, by using the driving method of the present embodiment, in the photoelectric conversion device 100 having the plurality of pixels 12, information of an event having a long period may be recorded while suppressing the amount of data held in the count processing units 32A and 32B.

As described above, according to the present embodiment, in the photoelectric conversion device having the function of counting incident photons, high functionality of exposure control may be realized.

Fourth Embodiment

A method of driving a photoelectric conversion device according to a fourth embodiment of the disclosure will be described with reference to FIG. 9 and FIG. 10. The same components as those of the photoelectric conversion device according to the first to third embodiments are denoted by the same reference numerals, and the description thereof will be omitted or simplified. In the present embodiment, another driving method of the photoelectric conversion device according to the first embodiment will be described.

Figure 9:
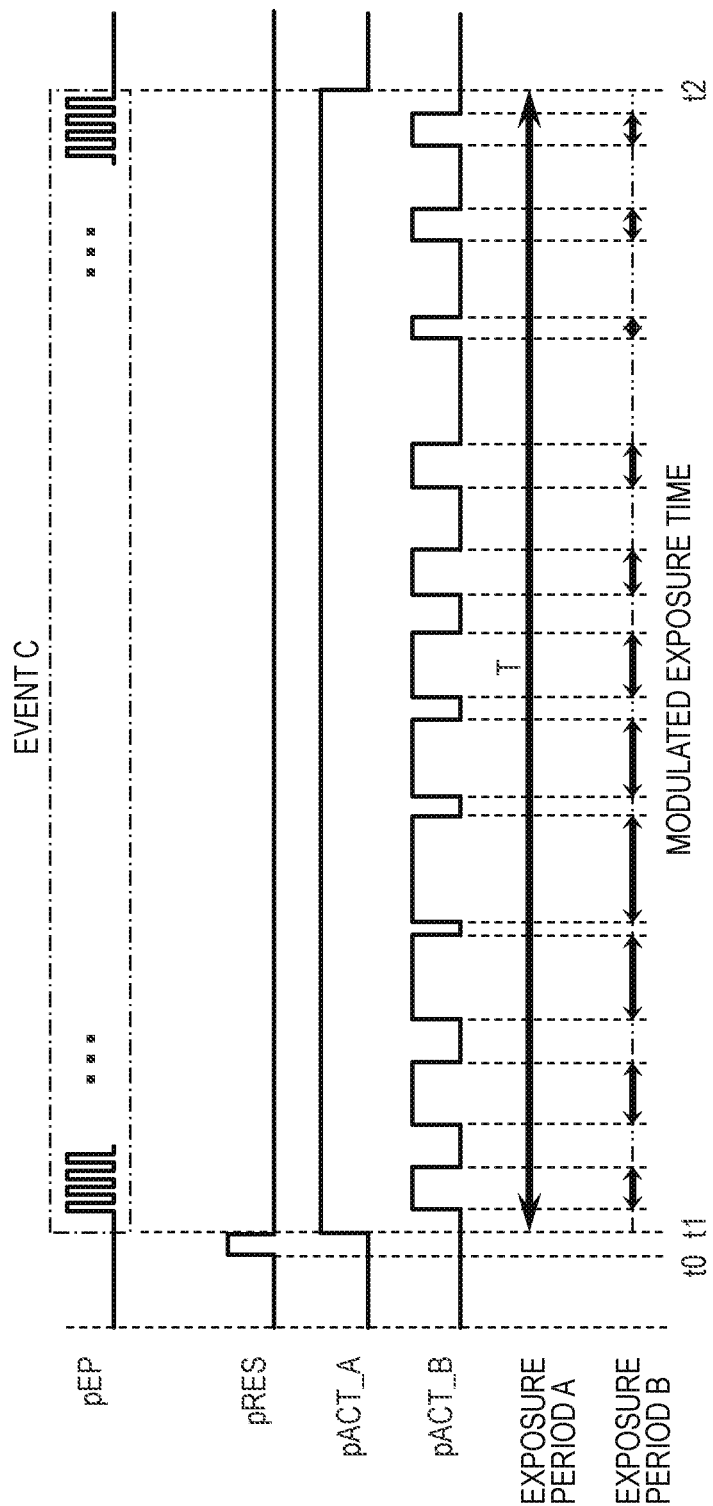
FIG. 9 is a timing chart illustrating an example of a method of driving the photoelectric conversion device according to a fourth embodiment.
Figure 10:
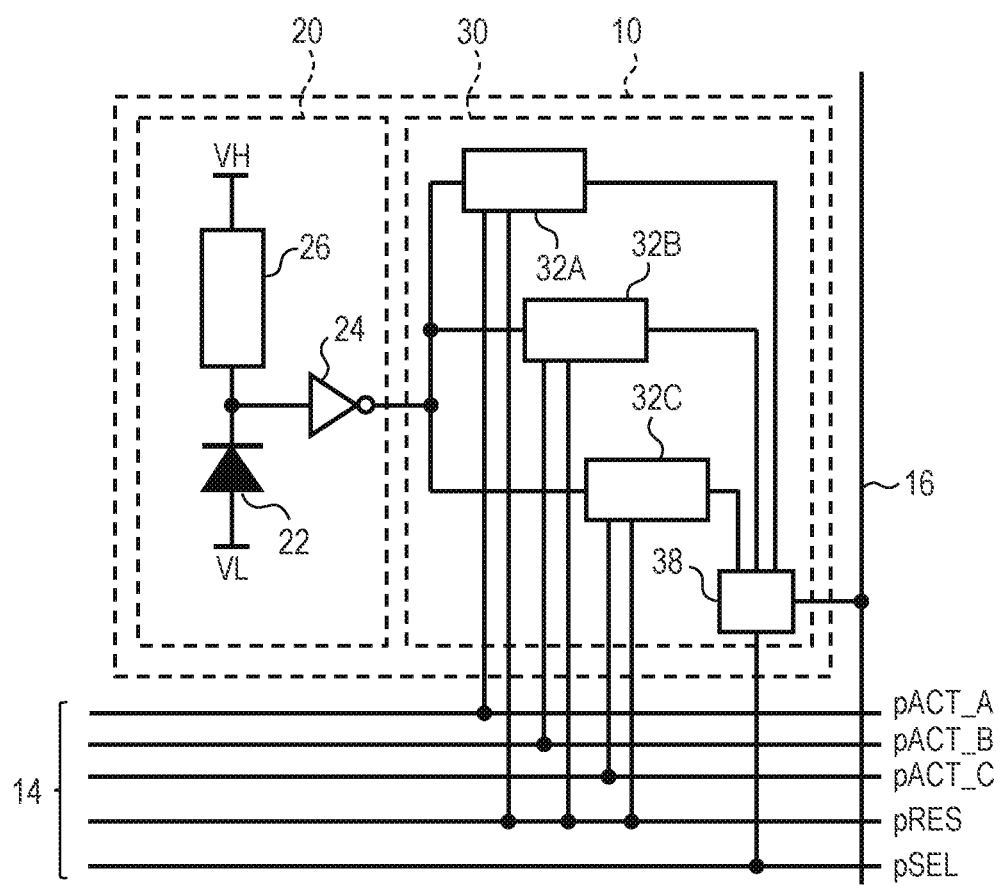
FIG. 10 is a block diagram illustrating a configuration example of a pixel of a photoelectric conversion device according to a modified example of the fourth embodiment.

FIG. 9 is a timing chart illustrating an example of a method of driving the photoelectric conversion device according to the present embodiment. The timing chart of FIG. 9 illustrates a pulse signal pEP, control signals pRES, pACT_A, and pACT_B, and exposure periods A and B.

In the present embodiment, it is assumed that an event (event C) in which photons enter the pixel 12 occurs between time t1 and time t2.

The control signal pACT_A becomes active at time t1 when the event C starts, and becomes inactive at time t2 when the event C ends. That is, the period from time t1 to time t2 is the exposure period A.

On the other hand, the control signal pACT_B is a signal obtained by pulse density modulation of a sine wave, and is supplied to the count processing unit 32B during a period from time t1 to time t2. Of the period from time t1 to time t2, the period during which the control signal pACT_B is active is the exposure period B.

The count value held by the counter 34 of the count processing unit 32A at time t2 is a value corresponding to the number of photons incident on the pixel 12 between time t1 and time t2. On the other hand, the count value held by the counter 34 of the count processing unit 32B at time t2 is a value obtained by digitally modulating the number of photons incident on the pixel 12 from time t1 to time t2 by the exposure time. Modulating the number of incident photons by exposure time has the effect of retaining information that is lost when the number of incident photons is simply time-integrated.

According to the driving method of the present embodiment, in the photoelectric conversion device 100 having the plurality of pixels 12, an image in which a sufficient exposure time is secured may be acquired from the count processing unit 32A of each pixel 12, and an image in which the exposure time is modulated may be acquired from the count processing unit 32B of each pixel 12. By synthesizing these two images in the signal processing unit in the subsequent stage, it is possible to acquire an image in which noise is small and motion blur and shake are eliminated.

In the present embodiment, a signal obtained by pulse density modulation of a sine wave is applied as the control signal pACT_B, but the control signal pACT_B may be another pulse group. The modulation method may be changed by changing the group of pulses constituting the control signal pACT_B.

In the present embodiment, the pixel signal processing unit 30 of each pixel 12 has two count processing units 32A and 32B, but the number of count processing units 32 included in the pixel signal processing unit 30 is not limited to two, and may be three or more. Each pixel 12 may include three count processing units 32A, 32B, and 32C, for example, as illustrated in FIG. 10. By configuring the pixel signal processing unit 30 in this manner, in the photoelectric conversion device 100 having the plurality of pixels 12, a plurality of images obtained by modulating the exposure time by a plurality of sine waves having different phases may be obtained. By synthesizing these images in a signal processing unit in a subsequent stage, information such as an optical flow of an object may be acquired.

As described above, according to the present embodiment, in the photoelectric conversion device having the function of counting incident photons, high functionality of exposure control may be realized.

Fifth Embodiment

Figure 11:
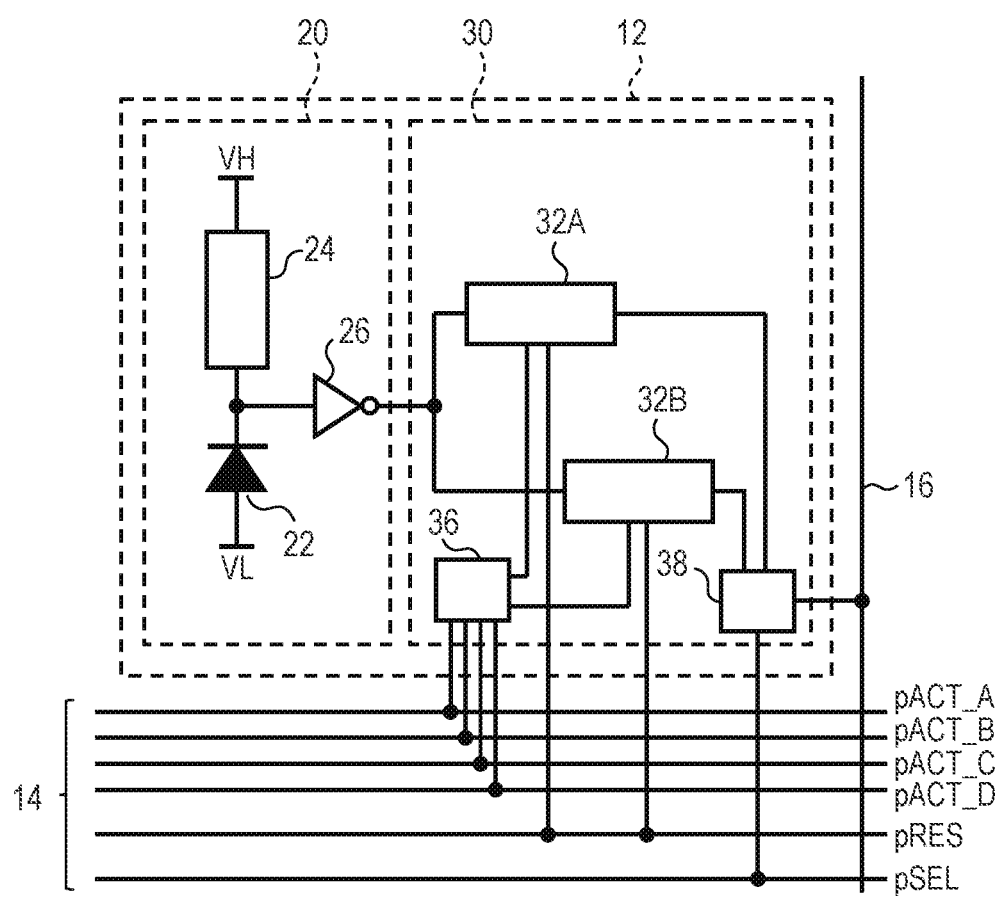
FIG. 11 is a block diagram illustrating a configuration example of a pixel of a photoelectric conversion device according to a modified example of a fifth embodiment.
Figure 12:
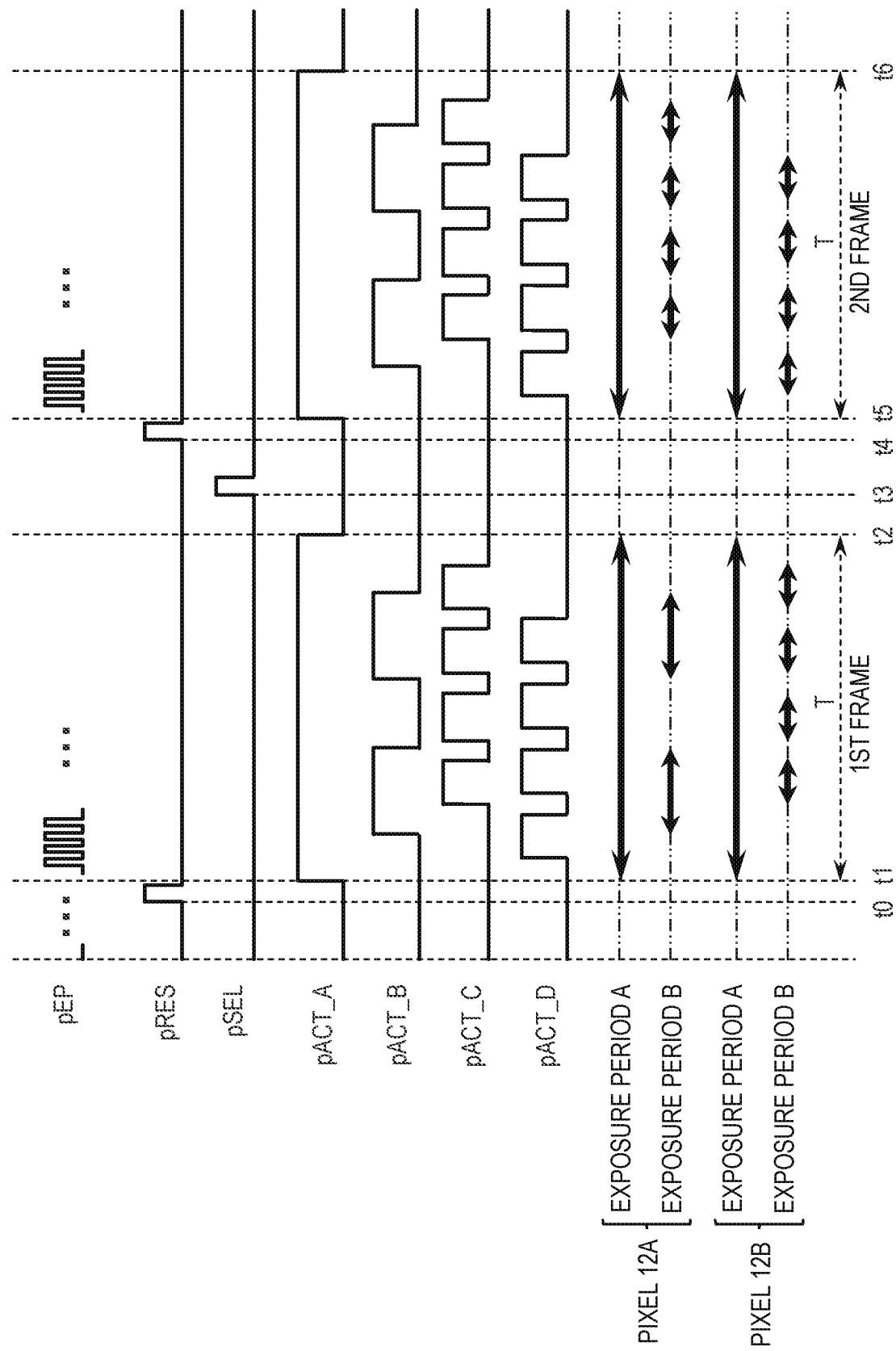
FIG. 12 is a timing chart illustrating an example of a method of driving a photoelectric conversion device according to the fifth embodiment.

A photoelectric conversion device and a method of driving the same according to a fifth embodiment of the disclosure will be described with reference to FIG. 11 and FIG. 12. The same components as those of the photoelectric conversion devices according to the first to fourth embodiments are denoted by the same reference numerals, and the description thereof will be omitted or simplified. FIG. 11 is a block diagram illustrating a configuration example of a pixel of the photoelectric conversion device according to the present embodiment. FIG. 12 is a timing chart illustrating an example of a method of driving the photoelectric conversion device according to the present embodiment.

In the photoelectric conversion device according to the present embodiment, as illustrated in FIG. 11, the pixel signal processing unit 30 of the pixel 12 further includes a control signal selection circuit 36. The control line 14 further includes a signal line to which the control signal pACT_C is supplied and a signal line to which the control signal pACT_D is supplied. The four input nodes of the control signal selection circuit 36 are respectively connected to a signal line to which the control signal pACT_A is supplied, a signal line to which the control signal pACT_B is supplied, a signal line to which the control signal pACT_C is supplied, and a signal line to which the control signal pACT_D is supplied. Two output nodes of the control signal selection circuit 36 are connected to one control node of the count processing unit 32A and one control node of the count processing unit 32B, respectively. Other points are the same as those of the photoelectric conversion device according to the first embodiment.

The control signal selection circuit 36 has a function of supplying a control signal selected from the control signals pACT_A, pACT_B, pACT_C, and pACT_D to the count processing unit 32A and the count processing unit 32B. Combinations of control signals supplied to the count processing unit 32A and the count processing unit 32B may be the same or different for all the pixels 12 constituting the pixel unit 10. In addition, on condition that the same control signal is not input to the count processing unit 32A and the count processing unit 32B of one pixel 12, a randomly selected control signal may be supplied to each of the plurality of pixels 12.

The active period and the inactive period in the count processing unit 32A and the count processing unit 32B are defined by the control signals selected by the control signal selection circuit 36.

Next, a method of driving the photoelectric conversion device according to the present embodiment will be described with reference to FIG. 12. The timing chart of FIG. 12 illustrates the pulse signal pEP, the control signals pRES, pSEL, pACT_A, pACT_B, pACT_C, and the pACT_D, the exposure periods A and B of the pixel 12A, and the exposure periods A and B of the pixel 12B. The pixel 12A and the pixel 12B are arbitrary pixels among the plurality of pixels 12 constituting the pixel unit 10.

Here, a timing at which any of the control signals pACT_A, pACT_B, pACT_C, and pACT_D changes from inactive to active first after the timing at which the control signal pRES changes from active to inactive is defined as a first time. A timing at which any of the control signals pACT_A, pACT_B, pACT_C, and pACT_D lastly changes from active to inactive after the first time and before the timing at which the control signal pRES changes from inactive to active next is defined as the second time. A period between the first time and the second time is referred to as a frame.

In the example of FIG. 12, a first time that is the start timing of one frame (first frame) is time t1, and a second time that is the end timing of the one frame is time t2. A first time, which is the start timing of a next frame (second frame), is time t5, and a second time, which is the end timing of the next frame, is time t6.

Here, as an example, it is assumed that the control signal pACT_A is a control signal that is always active during a frame period. The control signals pACT_B, pACT_C, and pACT_D are control signals that repeat active and inactive during a frame period. The control signal pACT_B becomes active twice during the frame period. The control signals pACT_C and pACT_D are control signals that are active four times during the frame period. The phase of the control signal pACT_C and the phase of the control signal pACT_D are different from each other.

First, at time t0, the control signal pRES becomes active (High level), and the count value of the counter 34 of the count processing unit 32A and the count value of the counter 34 of the count processing unit 32B of each pixel 12 are reset to 0.

At time t1 after the control signal pRES becomes inactive (Low level), the first frame starts. In the pixel 12A, the control signal selection circuit 36 selects the control signal pACT_A as a control signal to be supplied to the count processing unit 32A, and selects the control signal pACT_B as a control signal to be supplied to the count processing unit 32B. In the pixel 12B, the control signal selection circuit 36 selects the control signal pACT_A as a control signal to be supplied to the count processing unit 32A, and selects the control signal pACT_C as a control signal to be supplied to the count processing unit 32B.

Thus, in the count processing unit 32A of the pixel 12A, the number of incident photons is counted during the exposure period A corresponding to the control signal pACT_A. In the count processing unit 32B of the pixel 12A, the number of incident photons is counted during the exposure period B corresponding to the control signal pACT_B. Similarly, in the count processing unit 32A of the pixel 12B, the number of incident photons is counted during the exposure period A corresponding to the control signal pACT_A. In the count processing unit 32B of the pixel 12B, the number of incident photons is counted during the exposure period B corresponding to the control signal pACT_C. The counting process in each pixel 12 is performed until time t2.

As described above, in the first frame, the set of control signals pACT supplied to the count processing unit 32A and the count processing unit 32B of the pixel 12A is different from the set of control signals pACT supplied to the count processing unit 32A and the count processing unit 32B of the pixel 12B.

At subsequent time t3, the control signal pSEL becomes active (High level), and the count values held by the counters 34 of the count processing units 32A and 32B of the respective pixels 12 are output to the readout circuit unit 50 via the data lines 16.

At subsequent time t4, the control signal pRES becomes active, and the count value of the counter 34 of the count processing unit 32A and the count value of the counter 34 of the count processing unit 32B of each pixel 12 are reset to 0.

At time t5 after the control signal pRES becomes inactive, the second frame is started. In the pixel 12A, the control signal selection circuit 36 selects the control signal pACT_A as a control signal to be supplied to the count processing unit 32A, and selects the control signal pACT_C as a control signal to be supplied to the count processing unit 32B. In the pixel 12B, the control signal selection circuit 36 selects the control signal pACT_A as a control signal to be supplied to the count processing unit 32A, and selects the control signal pACT_D as a control signal to be supplied to the count processing unit 32B.

Thus, in the count processing unit 32A of the pixel 12A, the number of incident photons is counted during the exposure period A corresponding to the control signal pACT_A. In the count processing unit 32B of the pixel 12A, the number of incident photons is counted during the exposure period B according to the control signal pACT_C. Similarly, in the count processing unit 32A of the pixel 12B, the number of incident photons is counted during the exposure period A corresponding to the control signal pACT_A. In the count processing unit 32B of the pixel 12B, the number of incident photons is counted during the exposure period B according to the control signal pACT_D. The counting process in each pixel 12 is performed until time t6.

As described above, in the second frame, the set of control signals pACT supplied to the count processing unit 32A and the count processing unit 32B of the pixel 12A is different from the set of control signals pACT supplied to the count processing unit 32A and the count processing unit 32B of the pixel 12B. The set of control signals pACT supplied to the count processing unit 32A and the count processing unit 32B of the pixel 12A in the first frame is different from the set of control signals pACT supplied to the count processing unit 32A and the count processing unit 32B of the pixel 12A in the second frame. Similarly, the set of control signals pACT supplied to the count processing unit 32A and the count processing unit 32B of the pixel 12B in the first frame is different from the set of control signals pACT supplied to the count processing unit 32A and the count processing unit 32B of the pixel 12B in the second frame.

Thereafter, similarly to the first frame, the count values held by the counters 34 of the count processing units 32A and 32B of the respective pixels 12 are output to the readout circuit unit 50 via the data lines 16.

According to the driving method of the present embodiment, in the photoelectric conversion device 100 having the plurality of pixels 12, it is possible to acquire an image in which the pattern of the exposure period is changed for each pixel 12 or each frame. By synthesizing these images in the signal processing unit in the subsequent stage, it is possible to reconstruct an image having a high temporal resolution and a high spatial resolution.

As described above, according to the present embodiment, in the photoelectric conversion device having the function of counting incident photons, high functionality of exposure control may be realized.

Sixth Embodiment

Figure 13:
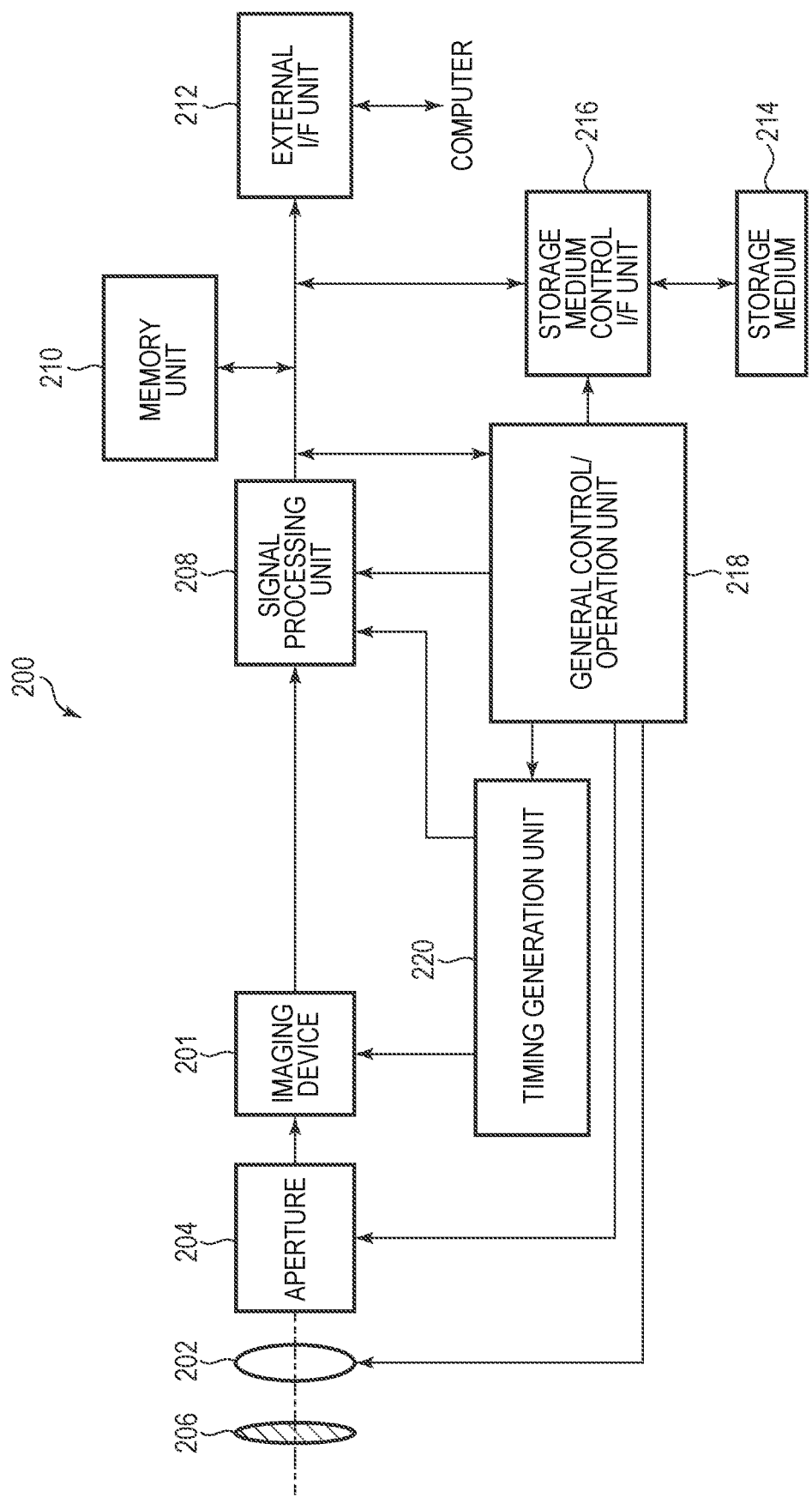
FIG. 13 is a block diagram illustrating a schematic configuration of an imaging system according to a sixth embodiment.

An imaging system according to a sixth embodiment of the disclosure will be described with reference to FIG. 13. FIG. 13 is a block diagram illustrating a schematic configuration of an imaging system according to the present embodiment.

The photoelectric conversion device 100 described in the first to fifth embodiments is applicable to various imaging systems. Examples of applicable imaging systems include a digital still camera, a digital camcorder, a surveillance camera, a copier, a fax, a cellular phone, an in-vehicle camera, and an observation satellite. A camera module including an optical system such as a lens and an imaging apparatus is also included in the imaging system. FIG. 13 is a block diagram of a digital still camera.

The imaging system 200 illustrated in FIG. 13 includes an imaging device 201, a lens 202 that forms an optical image of an object on the imaging device 201, an aperture 204 that varies the amount of light passing through the lens 202, and a barrier 206 that protects the lens 202. The lens 202 and the aperture 204 are optical systems for focusing light on the imaging device 201. The imaging device 201 is the photoelectric conversion device 100 described in any of the first to fifth embodiments, and converts an optical image formed by the lens 202 into image data.

The imaging system 200 also includes a signal processing unit 208 that processes an output signal output from the imaging device 201. The signal processing unit 208 generates image data from the digital signal output from the imaging device 201. The signal processing unit 208 performs various types of correction and compression as necessary to output image data. The imaging device 201 may include an AD conversion unit that generates a digital signal to be processed by the signal processing unit 208. The AD conversion unit may be formed on a semiconductor layer (semiconductor substrate) on which the photoelectric conversion unit of the imaging device 201 is formed, or may be formed on a semiconductor substrate different from the semiconductor layer on which the photoelectric conversion unit of the imaging device 201 is formed. The signal processing unit 208 may be formed on the same semiconductor substrate as the imaging device 201.

The imaging system 200 further includes a memory unit 210 that temporarily stores image data, and an external interface unit (external I/F unit) 212 that communicates with an external computer or the like. The imaging system 200 further includes a storage medium 214 such as a semiconductor memory for recording or reading out imaging data, and a storage medium control interface unit (storage medium control I/F unit) 216 that stores or reading out imaging data on or from the storage medium 214. The storage medium 214 may be built in the imaging system 200 or may be detachable.

The imaging system 200 further includes a general control/operation unit 218 that controls various calculations and the entire digital still camera, and a timing generation unit 220 that outputs various timing signals to the imaging device 201 and the signal processing unit 208. Here, the timing signals or the like may be input from the outside, and the imaging system 200 may include at least the imaging device 201 and the signal processing unit 208 that processes the output signal output from the imaging device 201.

The imaging device 201 outputs an imaging signal to the signal processing unit 208. The signal processing unit 208 performs predetermined signal processing on the imaging signal output from the imaging device 201, and outputs image data. The signal processing unit 208 generates an image using the imaging signal.

As described above, according to the present embodiment, an imaging system to which the photoelectric conversion device 100 according to the first to fifth embodiments is applied may be realized.

Seventh Embodiment

Figure 14A:
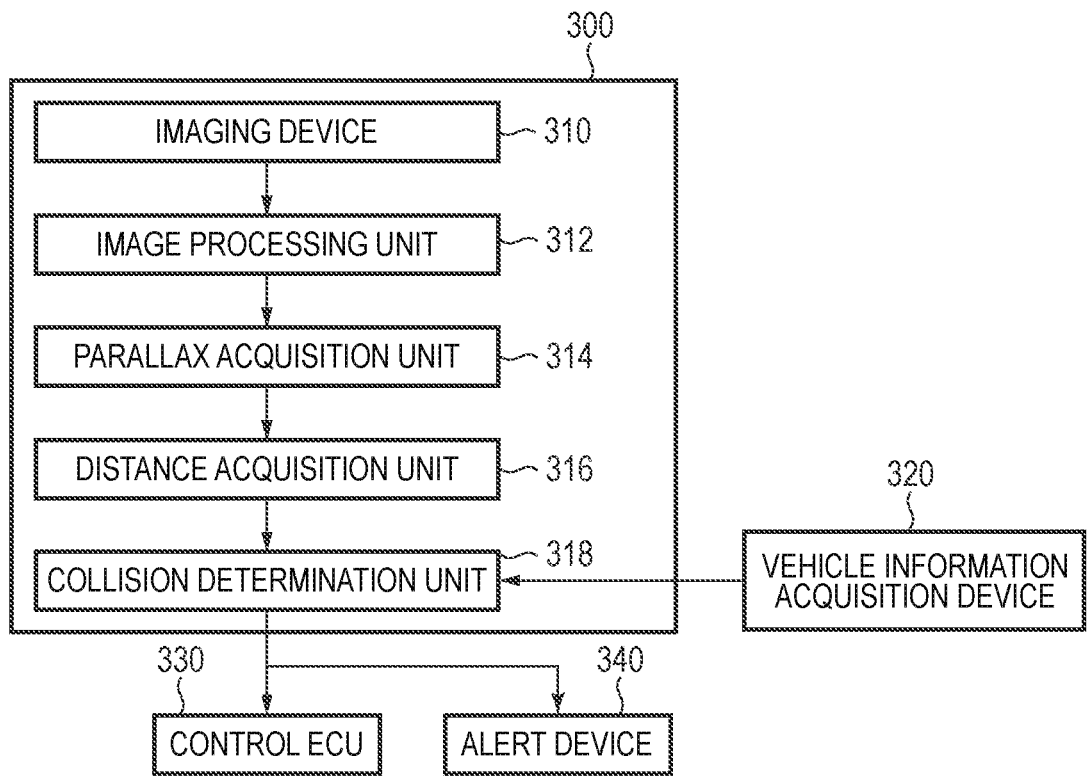
FIG. 14A is a diagram illustrating a configuration example of an imaging system according to a seventh embodiment.
Figure 14B:
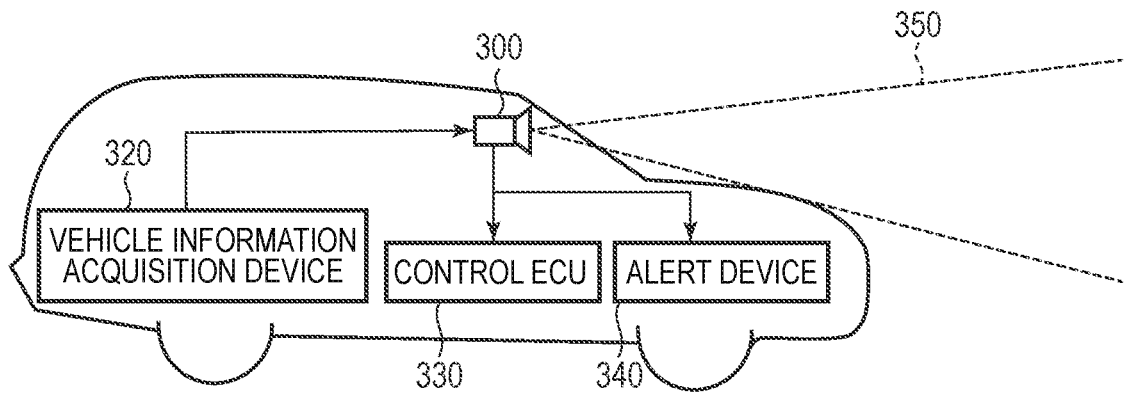
FIG. 14B is a diagram illustrating a configuration example of a movable object according to the seventh embodiment.

An imaging system and a movable object according to a seventh embodiment of the disclosure will be described with reference to FIG. 14A and FIG. 14B. FIG. 14A is a diagram illustrating a configuration of an imaging system according to the present embodiment. FIG. 14B is a diagram illustrating a configuration of a movable object according to the present embodiment.

FIG. 14A illustrates an example of an imaging system related to an in-vehicle camera. The imaging system 300 includes an imaging device 310. The imaging device 310 is the photoelectric conversion device 100 according to any one of the first to fifth embodiments. The imaging system 300 includes an image processing unit 312 that performs image processing on a plurality of image data acquired by the imaging device 310, and a parallax acquisition unit 314 that calculates parallax (phase difference of disparity images) from the plurality of image data acquired by the imaging device 310. The imaging system 300 also includes a distance acquisition unit 316 that calculates the distance to the object based on the calculated parallax, and a collision determination unit 318 that determines whether there is a possibility of collision based on the calculated distance. Here, the parallax acquisition unit 314 and the distance acquisition unit 316 are an example of a distance information acquisition unit that acquires distance information to an object. That is, the distance information is information related to parallax, defocus amount, distance to the object, and the like. The collision determination unit 318 may determine the possibility of collision using any of the distance information. The distance information acquisition means may be realized by hardware designed exclusively, or may be realized by a software module. It may be realized by FPGA (Field Programmable Gate Array), ASIC (Application Specific Integrated circuit), or the like, or may be realized by a combination of these.

The imaging system 300 is connected to the vehicle information acquisition device 320, and may acquire vehicle information such as a vehicle speed, a yaw rate, and a steering angle. Further, the imaging system 300 is connected to a control ECU 330, which is a control device that outputs a control signal for generating braking force to the vehicle based on the determination result obtained by the collision determination unit 318. The imaging system 300 is also connected to an alert device 340 that issues an alert to the driver based on the determination result obtained by the collision determination unit 318. For example, when the collision possibility is high as the determination result of the collision determination unit 318, the control ECU 330 performs vehicle control to avoid collision and reduce damage by applying a brake, returning an accelerator, suppressing engine output, or the like. The alert device 340 sounds an alarm such as a sound, displays alert information on a screen of a car navigation system or the like, and provides a warning to the user by applying vibration to a seatbelt or steering.

In the present embodiment, an image of the periphery of the vehicle, for example, the front or the rear is captured by the imaging system 300. FIG. 14B illustrates an imaging system in the case of capturing an image of the front of the vehicle (imaging range 350). The vehicle information acquisition device 320 sends an instruction to the imaging system 300 or the imaging device 310. With such a configuration, the accuracy of distance measurement may be further improved.

Although an example in which the vehicle is controlled so as not to collide with another vehicle has been described above, the disclosure is also applicable to a control in which the vehicle is automatically driven following another vehicle, a control in which the vehicle is automatically driven so as not to protrude from a lane, and the like. Further, the imaging system may be applied not only to a vehicle such as a host vehicle, but also to a movable object (mobile device) such as a ship, an aircraft, or an industrial robot. In addition, the disclosure may be applied not only to a movable object but also to an apparatus using object recognition in a wide range such as an advanced road traffic system (ITS).

Modified Embodiments

The disclosure is not limited to the above embodiments, and various modifications are possible.

For example, an example in which a configuration of a part of any embodiment is added to another embodiment or an example in which a configuration of a part of another embodiment is substituted is also an embodiment of the disclosure.

In the first to fifth embodiments, the circuit configuration of the pixel 12 is not limited to that illustrated in FIG. 2. For example, although the quenching element 24 is connected to the cathode terminal side of the photon detection element 22 in FIG. 2, the quenching element 24 may be connected to the anode terminal side of the photon detection element 22. In this case, the waveform shaper 26 may be connected between the anode terminal of the photon detection element 22 and the quenching element 24. Further, a switch such as a transistor may be provided between the photon detection element 22 and the quenching element 24 and between the photoelectric conversion unit 20 and the pixel signal processing unit 30 to control an electrical connection state between them. Further, a switch such as a transistor may be provided between the node to which the voltage VH is supplied and the quenching element 24 and/or between the node to which the voltage VL is supplied and the photon detection element 22 to control the electrical connection state therebetween.

The pixel signal processing unit 30 is not necessarily provided in all the pixels 12, and a plurality of pixels 12 may share one pixel signal processing unit 30. In this case, signals output from the photoelectric conversion units 20 of the plurality of pixels 12 may be sequentially processed by one pixel signal processing unit 30.

Although the pixel signal processing unit 30 having the count processing units 32A and 32B has been described in the first to fifth embodiments, the number of the count processing units 32 included in the pixel signal processing unit 30 is not limited to two, and may be three or more.

In the first to fifth embodiments, the relationship between the signal level of the control signal and the states of the count processing unit 32 and the like is defined by positive logic in which the active state is set when each control signal is at the High level, but may be defined by negative logic.

In the fifth embodiment, the control signals supplied to the count processing units 32A and 32B are selected from among the four types of control signals pACT_A, pACT_B, pACT_C, and pACT_D, but the number of control signals pACT is not limited to four. Further, the number of control signals pACT is not necessarily the same in all the pixels 12 constituting the pixel unit 10.

The imaging systems described in the sixth and seventh embodiments are examples of an imaging system to which the photoelectric conversion device of the disclosure may be applied, and the imaging system to which the photoelectric conversion device of the disclosure may be applied is not limited to the configurations illustrated in FIG. 13 and FIG. 14A.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-209596, filed Dec. 17, 2020 which is hereby incorporated by reference herein in its entirety.

What is claimed is:

1. A photoelectric conversion device comprising:
a photoelectric conversion unit configured to output a pulse signal in response to an incident of photon;
a signal processing unit connected to the photoelectric conversion unit and configured to count the pulse signal; and
a control unit configured to control the signal processing unit,
wherein the signal processing unit includes a first count processing unit and a second count processing unit connected in parallel,
wherein the control unit is configured to set an active period and an inactive period for each of the first count processing unit and the second count processing unit, and
wherein a period during which the first count processing unit is active includes a first period during which the second count processing unit is active and a second period during which the second count processing unit is inactive.

2. The photoelectric conversion device according to claim 1, wherein a length of a period during which the second count processing unit is continuously active is the same as a length of the second period.

3. The photoelectric conversion device according to claim 1, wherein a length of a period during which the first count processing unit is continuously active is equal to a length of a period during which the second count processing unit is continuously active.

4. The photoelectric conversion device according to claim 1,
wherein a number of times the first count processing unit becomes active during a predetermined period is a first number of times, and
wherein a number of times the second count processing unit becomes active during the predetermined period is a second number of times greater than the first number of times.

5. The photoelectric conversion device according to claim 4, wherein the first count processing unit becomes active once during a period including a middle of the predetermined period.

6. The photoelectric conversion device according to claim 4, wherein a period during which the second count processing unit is active and a period during which the second count processing unit is inactive are periodically repeated during the predetermined period.

7. The photoelectric conversion device according to claim 4, wherein a total length of a period during which the first count processing unit is active during the predetermined period is equal to a total length of a period during which the second count processing unit is active during the predetermined period.

8. The photoelectric conversion device according to claim 4,
wherein the signal processing unit further includes a third count processing unit connected in parallel with the first count processing unit and the second count processing unit,
wherein the control unit is further configured to set an active period and an inactive period for the third count processing unit,
wherein a number of times the third count processing unit becomes active during the predetermined period is a third number of times greater than the first number of times, and
wherein a period during which the second count processing unit is active and a period during which the third count processing unit is active are at least partially different from each other.

9. The photoelectric conversion device according to claim 4, wherein the predetermined period is a frame period.

10. The photoelectric conversion device according to claim 1, wherein the photoelectric conversion device includes a plurality of pixels each including the photoelectric conversion unit and the signal processing unit.

11. The photoelectric conversion device according to claim 10,
wherein each of the plurality of pixels further includes a control signal selection circuit configured to select a control signal supplied to each of the first count processing unit and the second count processing unit from a plurality of control signals supplied from the control unit, and
wherein the active period and the inactive period of the first count processing unit, and the active period and the inactive period of the second count processing unit are defined by control signals selected by the control signal selection circuit.

12. The photoelectric conversion device according to claim 11, wherein a set of the control signals supplied to the first count processing unit and the second count processing unit of the first pixel of the plurality of pixels is different from a set of the control signals supplied to the first count processing unit and the second count processing unit of the second pixel of the plurality of pixels.

13. The photoelectric conversion device according to claim 11, wherein a set of the control signals supplied to the first count processing unit and the second count processing unit of at least one of the plurality of pixels in one frame period differs from a set of the control signals supplied to the first count processing unit and the second count processing unit of the one plurality of pixels in another frame period.

14. The photoelectric conversion device according to claim 1, wherein the photoelectric conversion unit includes an avalanche photodiode, a quenching element connected to the avalanche photodiode, and a waveform shaper having an input node connected to a node connecting the avalanche photodiode and the quenching element.

15. The photoelectric conversion device according to claim 1,
wherein the photoelectric conversion device includes a first substrate and a second substrate stacked on the first substrate, and
wherein the first substrate is provided with the photoelectric conversion unit, and the second substrate is provided with the signal processing unit.

16. An imaging system comprising:
the photoelectric conversion device according to claim 1; and
a signal processing device configured to process a signal output from the photoelectric conversion device.

17. A movable object comprising:
the photoelectric conversion device according to claim 1;
a distance information acquiring unit configured to acquire distance information to an object from a parallax image based on a signal output from the photoelectric conversion device; and
a control unit configured to control the movable object based on the distance information.

18. The photoelectric conversion device according to claim 1, wherein the signal processing unit includes the first count processing unit and the second count processing unit arranged in parallel.

19. The photoelectric conversion device according to claim 1,
wherein photoelectric conversion unit is electrically connected to the first count processing unit; and
wherein photoelectric conversion unit is electrically connected to the second count processing unit.

20. A photoelectric conversion device comprising:
a photoelectric conversion unit configured to output a pulse signal in response to an incident of photon;
a signal processing unit connected to the photoelectric conversion unit and configured to count the pulse signal; and
a control unit configured to control the signal processing unit,
wherein the signal processing unit includes a plurality of count processing units connected in parallel,
wherein the control unit is configured to set an active period and an inactive period for each of the plurality of count processing units,
wherein a period during which each of the plurality of count processing units is active is different from each other, and
wherein at least a part of the active period is overlapped in at least a part of the plurality of count processing units.

21. A method of driving a photoelectric conversion device including a photoelectric conversion unit configured to output a pulse signal in response to an incident of photon, and a signal processing unit connected to the photoelectric conversion unit and configured to count the pulse signal, wherein the signal processing unit includes a plurality of count processing units connected in parallel, the method comprising:
setting an active period and an inactive period in each of the plurality of count processing units such that the active periods of the plurality of count processing units are different from each other and at least a part of the active period is overlapped in at least a part of the plurality of count processing units.

* * * * *